United States Patent
Geirhofer et al.

(10) Patent No.: US 10,517,098 B2
(45) Date of Patent: Dec. 24, 2019

(54) INTERFERENCE COORDINATION FOR PEER-TO-PEER (P2P) COMMUNICATION AND WIDE AREA NETWORK (WAN) COMMUNICATION

(75) Inventors: Stefan Geirhofer, San Diego, CA (US); Naga Bhushan, San Diego, CA (US); Ravi Palanki, San Diego, CA (US); Jaber Mohammad Borran, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 13/188,146

(22) Filed: Jul. 21, 2011

(65) Prior Publication Data
US 2012/0044815 A1 Feb. 23, 2012

Related U.S. Application Data

(60) Provisional application No. 61/369,622, filed on Jul. 30, 2010.

(51) Int. Cl.
*H04W 16/02* (2009.01)
*H04W 72/08* (2009.01)
*H04W 52/24* (2009.01)

(52) U.S. Cl.
CPC ....... *H04W 72/082* (2013.01); *H04W 52/243* (2013.01)

(58) Field of Classification Search
CPC . H04W 52/24; H04W 52/243; H04W 52/383; H04W 72/1231; H04W 72/082;
(Continued)

(56) References Cited

U.S. PATENT DOCUMENTS 7,978,631 B1 * 7/2011 Abdelaziz ........... H04L 61/1582
370/255
8,452,317 B2 5/2013 Li et al.
(Continued)

FOREIGN PATENT DOCUMENTS

JP 2008510344 A 4/2008
WO 2006016331 A1 2/2006
(Continued)

OTHER PUBLICATIONS

Pfaffenberger, Webster's New World Computer Dictionary, entry for "Central Processing Unit", Hungry Minds, Inc., Ninth Edition, 2001, p. 68.*
(Continued)

*Primary Examiner* — Redentor Pasia
*Assistant Examiner* — Jose L Perez
(74) *Attorney, Agent, or Firm* — Arent Fox, LLP; Clint R. Morin

(57) ABSTRACT

Techniques for supporting peer-to-peer (P2P) communication in a wide area network (WAN) are disclosed. In an aspect, interference coordination between P2P devices engaged in P2P communication and WAN devices engaged in WAN communication may be performed based on a network-controlled architecture. For the network-controlled architecture, P2P devices may detect other P2P devices and/or WAN devices and may send measurements (e.g., for pathloss, interference, etc.) for the detected devices to the WAN (e.g., serving base stations). The WAN may perform resource partitioning and/or association for the P2P devices based on the measurements. Association may include selection of P2P communication or WAN communication for a given P2P device. Resource partitioning may include allocation of resources to a group of P2P devices for P2P communication. The WAN may send the results of associa-
(Continued)

tion and/or resource partitioning to the P2P devices, which may communicate in accordance with the association and/or resource partitioning results.

26 Claims, 7 Drawing Sheets

(58) Field of Classification Search
CPC .......... H04W 76/023; H04W 72/0406; H04W 72/085; H04W 72/08; H04W 72/04; H04W 72/02; H04W 76/02; H04W 8/005; H04W 76/23; H04W 76/14
USPC ................................................. 370/240–255
See application file for complete search history.

(56) References Cited

U.S. PATENT DOCUMENTS

| | | | | |
|---|---|---|---|---|
| 2002/0188657 A1* | 12/2002 | Traversat | ............... | G06F 9/4416 709/201 |
| 2004/0228305 A1* | 11/2004 | Grieco | ................. | H04B 1/7105 370/335 |
| 2005/0157674 A1* | 7/2005 | Wentink | ............... | H04B 7/2126 370/328 |
| 2005/0239451 A1* | 10/2005 | Periyalwar | .......... | H04W 52/383 455/425 |
| 2006/0160544 A1* | 7/2006 | Sun | ........................ | H04W 76/14 455/456.1 |
| 2006/0168343 A1* | 7/2006 | Ma | ........................ | H04W 52/38 709/245 |
| 2007/0129076 A1* | 6/2007 | Cho | ..................... | H04W 76/023 455/436 |
| 2007/0153747 A1* | 7/2007 | Pan | ....................... | H04W 36/14 370/338 |
| 2007/0211679 A1 | 9/2007 | Laroia et al. | | |
| 2008/0069033 A1* | 3/2008 | Li | ........................ | H04W 52/245 370/328 |
| 2008/0069039 A1* | 3/2008 | Li | ........................ | H04W 36/02 370/329 |
| 2008/0112334 A1* | 5/2008 | Laroia | ................. | H04W 40/244 370/254 |
| 2008/0186895 A1 | 8/2008 | Shang et al. | | |
| 2008/0313698 A1* | 12/2008 | Zhao | ....................... | H04L 63/08 726/1 |
| 2009/0011770 A1* | 1/2009 | Jung | ..................... | H04L 5/0037 455/452.1 |
| 2009/0011778 A1* | 1/2009 | Jung | .................. | H04W 76/023 455/456.3 |
| 2009/0017807 A1* | 1/2009 | Kwon | ................... | H04W 76/11 455/416 |
| 2009/0023460 A1* | 1/2009 | Cho | ........................ | H04W 4/02 455/456.2 |
| 2009/0082002 A1* | 3/2009 | Kim | ..................... | H04W 48/12 455/418 |
| 2009/0325625 A1* | 12/2009 | Hugl | ..................... | H04W 52/16 455/522 |
| 2010/0009675 A1* | 1/2010 | Wijting | ................. | H04W 76/14 455/426.1 |
| 2010/0093364 A1* | 4/2010 | Ribeiro | ............... | H04W 72/082 455/452.2 |
| 2010/0110999 A1* | 5/2010 | Li | ........................ | H04W 52/242 370/329 |
| 2010/0165882 A1* | 7/2010 | Palanki | ............... | H04W 76/023 370/254 |
| 2010/0169498 A1* | 7/2010 | Palanki | ................. | H04W 16/14 709/228 |
| 2010/0189048 A1* | 7/2010 | Baker | ................... | H04L 5/0037 370/329 |
| 2010/0260093 A1* | 10/2010 | Liu | ....................... | H04B 7/2606 370/315 |
| 2010/0261469 A1* | 10/2010 | Ribeiro | ................. | H04W 99/00 455/423 |
| 2010/0279672 A1* | 11/2010 | Koskela | ................ | H04W 36/30 455/418 |
| 2010/0322213 A1* | 12/2010 | Liu | .......................... | H04L 67/16 370/338 |
| 2011/0082939 A1* | 4/2011 | Montemurro | ....... | H04W 76/023 709/227 |
| 2011/0106952 A1* | 5/2011 | Doppler | ........... | H04W 72/0406 709/226 |
| 2011/0117907 A1* | 5/2011 | Hooli | .................... | H04W 72/02 455/422.1 |
| 2011/0275382 A1* | 11/2011 | Hakola | ................. | H04W 24/10 455/452.2 |
| 2012/0014334 A1* | 1/2012 | Oh | ....................... | H04W 72/085 370/329 |
| 2012/0020213 A1* | 1/2012 | Horneman | ............ | H04W 76/14 370/231 |
| 2012/0093098 A1* | 4/2012 | Charbit | ................. | H04W 72/04 370/329 |
| 2012/0243431 A1* | 9/2012 | Chen | ................. | H04W 72/0406 370/252 |

FOREIGN PATENT DOCUMENTS

| | | |
|---|---|---|
| WO | 2008034044 A2 | 3/2008 |
| WO | 2010053688 A1 | 5/2010 |
| WO | WO2010049801 A1 | 5/2010 |
| WO | 2010078273 A2 | 7/2010 |
| WO | WO2010082084 A1 | 7/2010 |

OTHER PUBLICATIONS

Partial International Search Report—PCT/US2011/045074—ISA/EPO—dated Oct. 6, 2011.
International Search Report and Written Opinion—PCT/US2011/045074—ISA/EPO—dated Dec. 15, 2011.
Doppler et al. "Device-to-Device Communication as an Underlay to LTE-Advanced Networks", IEEE Communications Magazine, Topics in Radio Communications. Dec. 2009. pp. 42-49.
European Office Action dated Mar. 24, 2015, for European Patent Application Serial No. 11746701.9, 10 pages.

* cited by examiner

INTERFERENCE COORDINATION FOR PEER-TO-PEER (P2P) COMMUNICATION AND WIDE AREA NETWORK (WAN) COMMUNICATION

The present application claims priority to provisional U.S. Application Ser. No. 61/369,622, entitled "INTERFERENCE COORDINATION FOR PEER-TO-PEER (P2P) COMMUNICATION AND WIDE AREA NETWORK (WAN) COMMUNICATION," filed Jul. 30, 2010, and incorporated herein by reference in its entirety.

BACKGROUND

I. Field

The present disclosure relates generally to communication, and more specifically to techniques for supporting peer-to-peer (P2P) communication and wide area network (WAN) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of devices. A device may communicate with a base station via the downlink and uplink. The downlink (or forward link) refers to the communication link from the base station to the device, and the uplink (or reverse link) refers to the communication link from the device to the base station. The device may also be able to communicate peer-to-peer with other devices. It may be desirable to efficiently support P2P communication between devices.

SUMMARY

Techniques for supporting P2P communication in a WAN are described herein. In an aspect, interference coordination between P2P devices engaged in P2P communication and WAN devices engaged in WAN communication may be performed based on a network-controlled architecture. For the network-controlled architecture, P2P devices may detect other P2P devices and/or WAN devices, make measurements (e.g., for pathloss, interference, etc.) for the detected devices, and send the measurements to the WAN (e.g., serving base stations). The WAN may perform resource partitioning and/or association for the P2P devices based on the measurements. Association may include selection of P2P communication or WAN communication for a given P2P device. Resource partitioning may include allocation or assignment of resources to a group of P2P devices for P2P communication.

In one design, a network entity (e.g., a base station) may receive at least one measurement from a first device, which may support P2P communication and WAN communication. The at least one measurement may be for at least one second device detected by the first device. The network entity may perform association to select P2P communication or WAN communication and/or resource partitioning to allocate resources for P2P communication for the first device based on the at least one measurement. The network entity may send the results of association and/or resource partitioning to the first device.

In one design, the first device may perform peer discovery and may detect at least one second device via peer discovery. The first device may obtain at least one measurement for the at least one second device and may send the at least one measurement to a WAN (e.g., a base station). The first device may also determine at least one network address of the at least one second device and may send the at least one network address of the at least one second device to the WAN. The first device may receive the results of association and/or resource partitioning from the WAN. The results may indicate whether P2P communication or WAN communication is selected for the first device and possibly resources allocated to the first device for P2P communication. The first device may communicate based on the results of association and/or resource partitioning received from the WAN.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
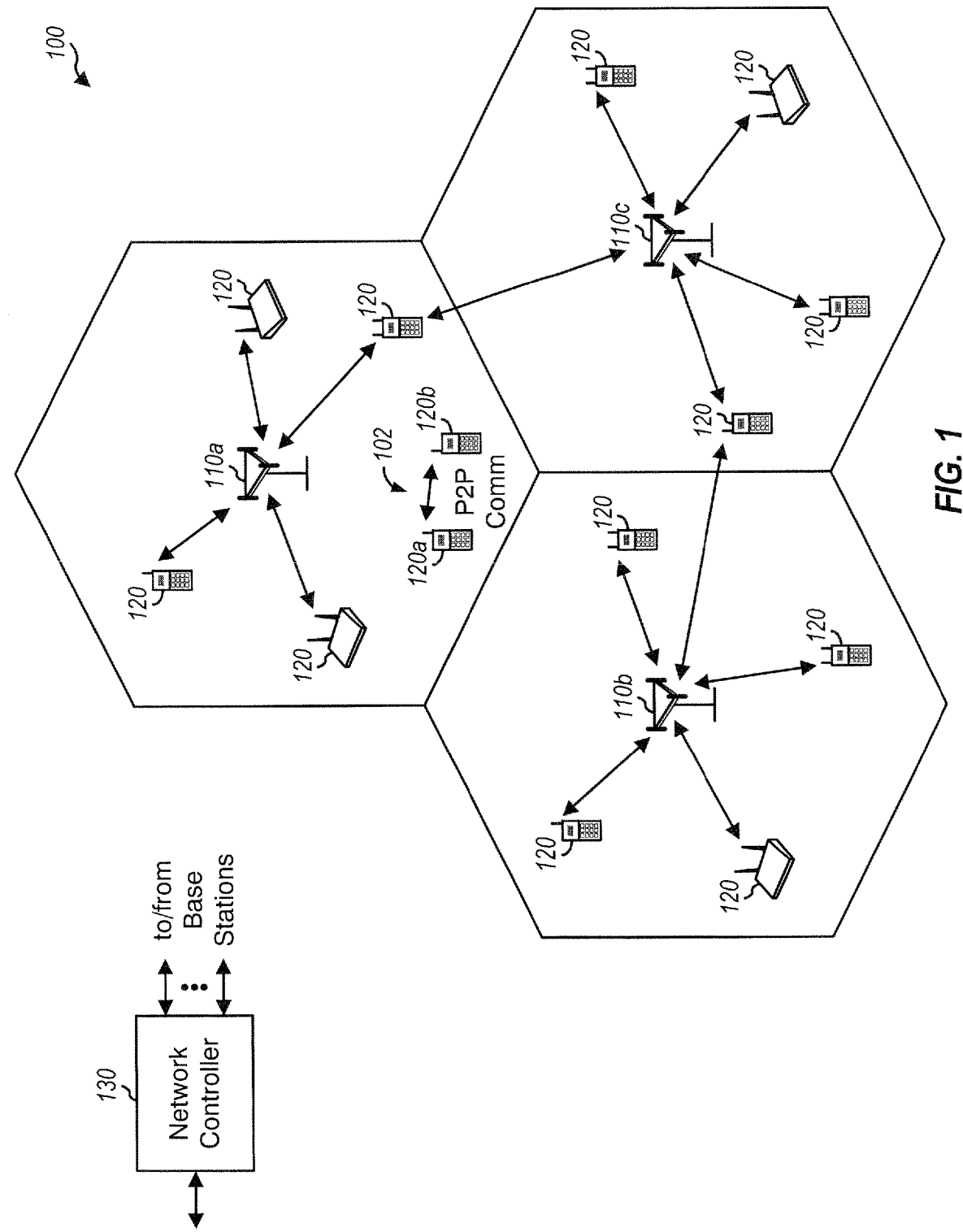
FIG. 1 shows a wireless communication network.

FIG. 1 shows a wireless communication network or WAN 100, which may include a number of base stations 110 and other network entities. A base station may be an entity that communicates with the devices and may also be referred to as a Node B, an evolved Node B (eNB), an access point, etc. Each base station 110 may provide communication coverage for a particular geographic area and may support communication for the devices located within the coverage area. To improve network capacity, the overall coverage area of a base station may be partitioned into multiple (e.g., three) smaller areas. Each smaller area may be served by a respective base station subsystem. In 3GPP, the term "cell" can refer to a coverage area of a base station and/or a base station subsystem serving this coverage area, depending on the context in which the term is used.

A network controller 130 may couple to a set of base stations and may provide coordination and control for these base stations. Network controller 130 may be a single network entity or a collection of network entities. Network controller 130 may communicate with the base stations via a backhaul. The base stations may also communicate with one another, e.g., directly or indirectly via wireless or wireline backhaul.

Devices 120 may be dispersed throughout the wireless network, and each device may be stationary or mobile. A device may also be referred to as a user equipment (UE), a user device, a mobile station, a terminal, an access terminal, a subscriber unit, a station, etc. A device may be a cellular phone, a smart phone, a tablet, a personal digital assistant (PDA), a wireless modem, a wireless communication device, a handheld device, a laptop computer, a cordless phone, a wireless local loop (WLL) station, a netbook, a smartbook, a peripheral device (e.g., a printer), etc.

A device may communicate with a base station in the wireless network. A device may also communicate peer-to-peer with other devices. In the example shown in FIG. 1, devices 120a and 120b may communicate peer-to-peer, and remaining devices 120 may communicate with base stations 110. Devices 120a and 120b may also be capable of communicating with base stations, e.g., when not engaged in P2P communication or possibly concurrent with P2P communication.

In the description herein, WAN communication refers to communication between devices via at least one base station in a wireless network. A WAN device is a device that is interested or engaged in WAN communication. P2P communication refers to direct communication between two or more devices, without going through any base station. A P2P device is a device that is interested or engaged in P2P communication, e.g., a device that has traffic data for another device within proximity of the P2P device. Two devices may be considered to be within proximity of one another, for example, if each device can detect the other device. In general, a device may communicate with another device either directly for P2P communication or via at least one base station for WAN communication.

In one design, direct communication between P2P devices may be organized in P2P groups. A P2P group refers to a group of two or more devices interested or engaged in P2P communication. For example, a P2P group 102 in FIG. 1 includes two devices 120a and 120b interested or engaged in P2P communication.

In one design, a P2P group may include a P2P group owner (or P2P server) and one or more P2P clients served by the P2P group owner. In one design, P2P communication may occur only within a P2P group and may further occur only between the P2P group owner and its P2P clients. For example, if two P2P clients within the same P2P group desire to exchange information, then the P2P group owner may relay transmissions for these P2P clients. In one design, a P2P client may belong in only one P2P group. In another design, a P2P client may belonging in more than one P2P group and may communicate with a P2P device in any P2P group at any given moment.

P2P communication may offer certain advantages over WAN communication, especially for devices located close to each other. In particular, efficiency may improve because the pathloss between two devices may be substantially smaller than the pathloss between either device to its serving base station. Furthermore, the two devices may communicate directly via a single transmission "hop" for P2P communication instead of via two transmission hops for WAN communication-one hop for the uplink from one device to its serving base station and another hop for the downlink from the same or different base station to the other device. P2P communication may thus be used to improve user capacity and also to improve network capacity by shifting some load over to P2P communication.

Wireless network 100 may support concurrent WAN connectivity for a group of P2P devices engaged in P2P communication. The WAN connectivity may be concurrent in that it may be perceived as such by both a user and upper layers of a protocol stack. This concurrency would typically not require a device to transmit and/or receive for both WAN communication and P2P communication simultaneously (e.g., in the same subframe).

In general, P2P communication may be supported (i) on the same spectrum used by wireless network 100 in a co-channel P2P deployment or (ii) on a different spectrum not used by wireless network 100 in a dedicated P2P deployment. The term "spectrum" may generically refer to a range of frequencies, which may correspond to a frequency channel, a frequency band, a subband, a carrier, etc. For example, P2P communication may be supported in unlicensed spectrum or white space spectrum for a dedicated P2P deployment, subject to any constraints governing the usage of such spectrum. Co-channel P2P deployment may be used, for example, when a separate spectrum is not available to support P2P communication. Accommodating P2P communication and WAN communication on the same spectrum may result in interference between WAN devices and P2P devices, which may be mitigated as described below.

Wireless network 100 may utilize FDD and may operate on one spectrum for the downlink and another spectrum for the uplink. P2P devices may not be able to transmit on the downlink spectrum in order to avoid causing interference to downlink transmissions from base stations. Hence, in a co-channel P2P deployment, some time-frequency resources on the uplink spectrum may be allocated for P2P communication. Alternatively, wireless network 100 may utilize TDD and may utilize the same spectrum for both the downlink and uplink. Some subframes may be allocated for the downlink, and the remaining subframes may be allocated for the uplink. In this case, in a co-channel P2P deployment, some time-frequency resources in the uplink subframes may be allocated for P2P communication.

In one design, P2P devices may communicate with one another using TDD. For example, a P2P server in a P2P group may transmit in some time intervals, and a P2P client in the P2P group may transmit in other time intervals. TDD may be used for P2P communication in both dedicated P2P deployments and co-channel P2P deployments.

For P2P communication, P2P devices may transmit on the uplink spectrum in an FDD deployment or in uplink subframes in a TDD deployment. The P2P devices may then cause interference to the uplink transmissions from WAN devices at their serving base stations. The P2P devices may also observe interference from the WAN devices on the uplink spectrum or in the uplink subframes. The interference may degrade the performance of the P2P devices as well as the WAN devices.

In an aspect, interference coordination may be performed to support P2P communication and WAN communication and may include the following components:

1. Resource partitioning between WAN communication and P2P communication, and
2. Resource partitioning between P2P devices.

Resource partitioning may also be referred to as resource coordination, resource allocation, etc. The term "allocate" and "assign" are synonymous and are used interchangeably herein.

The first component above may be applicable for co-channel P2P deployments. If P2P communication occurs on the same spectrum used for WAN communication, then P2P transmissions may cause interference to WAN transmissions, and vice versa. The severity of this interference may depend on various factors such as channel conditions. Nevertheless, it may be necessary or desirable to perform resource partitioning and allocate orthogonal resources to interfering WAN and P2P transmissions. For example, orthogonal resources may be defined for different frequency subbands, or different time slots or interlaces, or different resource blocks, etc. The orthogonal resources may relate to time, frequency, code, transmit power, etc.

The second component above may be applicable for both co-channel P2P deployments and dedicated P2P deployments. Resource partitioning among P2P devices may be performed since different P2P transmissions may strongly interfere with each other. While the interference coordination between WAN devices and P2P devices may be avoided by having the P2P devices operate on a dedicated frequency band or on semi-statically configured resources on which the WAN devices are not active, interference coordination between the P2P devices may be pertinent regardless of spectrum usage.

A device may be either (i) a WAN-only device capable of only WAN communication or (ii) a WAN/P2P device capable of both WAN communication and P2P communication. For a WAN/P2P device, an association decision (e.g., made by a base station) may determine whether the device operates in a P2P mode or a WAN mode. Some of the description below, except when considering association decisions themselves, assumes that an association decision for a device has already been made and that the device operates in either a P2P mode or a WAN mode. Association may be another way of performing interference coordination. Association may be different from the two components listed above in that it changes whether a device operates in the WAN mode or the P2P mode.

In another aspect, interference coordination between P2P devices and WAN devices may be performed based on a network-controlled architecture. For the network-controlled architecture, P2P devices may report measurements (e.g., for pathloss, interference, performance metrics, etc.) to their serving base stations. The base stations may perform resource partitioning and association for the P2P devices based on the measurements. The base stations may inform the P2P devices of the association decisions and the allocated resources.

The network-controlled architecture may differ from a network-transparent architecture in which a wireless network may provide connectivity but does not get involved in resource coordination among different P2P groups (except perhaps for setting aside an adequate amount of resources for the P2P communication). The network-transparent architecture may be augmented with optional network assistance in a manner that may be transparent to the P2P groups. Nevertheless, the network-transparent architecture may be fundamentally different from the network-controlled architecture.

The network-controlled architecture can exploit the presence of a wireless network to facilitate interference management between WAN communication and P2P communication and also between P2P groups. The network-controlled architecture may be used for (i) co-channel P2P deployments in which P2P communication and WAN communication occur on the same spectrum and (ii) dedicated P2P deployments in which P2P communication and WAN communication occur on separate spectrum. The network-controlled architecture may also be applicable for various radio technologies (e.g., LTE, CDMA, GSM, WiFi-direct, etc.) used for P2P communication. For clarity, certain aspects of the techniques are described below assuming that LTE-A is used for P2P communication.

In one design of the network-controlled architecture, a base station may perform resource partitioning for P2P groups possibly with some coordination among neighboring base stations that are associated with close-by P2P groups at cell edge. Resource partitioning between a WAN and P2P groups may be flexible. In a first design, a base station may statically or semi-statically perform resource partitioning and may simply reserve some resources for P2P communication. In this design, a P2P group may be assigned all or some of the reserved resources for P2P communication. In a second design, a base station may dynamically perform resource partitioning, e.g., when and as needed. In this design, a P2P group may be assigned some of the available resources, which may be selected at the time of the assignment. The second design may enable a P2P group to operate on the same resources as one or more WAN devices. For example, a P2P group near the cell edge may operate on the same resources as one or more WAN UEs located close to a base station or sufficiently far from the P2P group.

Resources may be shared between WAN devices and P2P devices by addressing both (i) interference that the WAN devices may cause to close-by P2P devices and (ii) interference that the P2P devices may cause to reception of transmissions from the WAN devices at base stations. In one design, interference from WAN devices to nearby P2P devices may be addressed by first identifying which P2P devices are close to the WAN devices and then avoiding strong interference from the WAN devices to the P2P devices through resource partitioning or scheduling.

Interference caused by P2P devices to WAN devices may be mitigated in various manners. In one design, interference caused by the P2P devices to WAN transmissions at the base stations may be addressed via resource partitioning. The base stations may assign resources to the P2P devices in a network-controlled fashion and possibly with some coordination among neighboring base stations. In another design, interference caused by the P2P devices to WAN transmissions may be addressed via power control. For example, the transmit power of the P2P devices may be limited to a particular maximum transmit power level that would result in an acceptable amount of interference to the WAN transmissions at the base stations. This maximum transmit power level may be an upper bound for the P2P devices. The P2P devices may use as little transmit power as possible in order to obtain the desired performance while minimizing interference to the WAN transmissions. A combination of power control and resource partitioning may also be used to mitigate interference from the P2P devices to the WAN transmissions.

Figure 2:
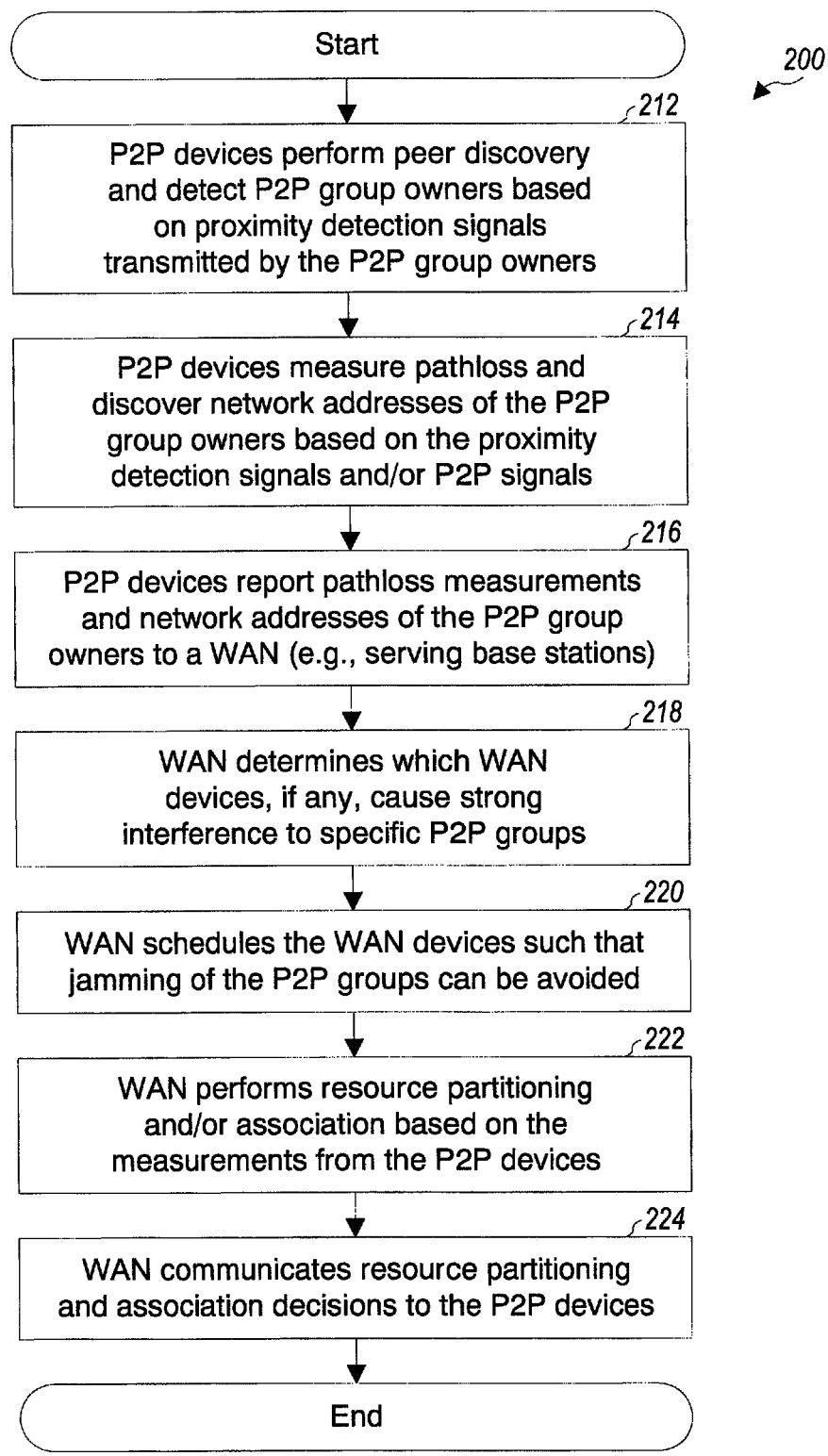
FIG. 2 shows a process for supporting P2P communication based on the network-controlled architecture.

FIG. 2 shows a design of a process 200 for supporting P2P communication based on the network-controlled architecture. In one design, P2P devices may perform peer discovery and detect P2P group owners based on proximity detection signals transmitted by the P2P group owners (block 212). Peer discovery may be performed by WAN/P2P devices operating in the P2P mode or the WAN mode but may not be supported by WAN-only devices. A proximity detection signal is a signal transmitted by a device to aid discovery and measurement of the device and/or for other purposes. The P2P devices may measure pathloss and discover network addresses of the P2P group owners based on the proximity detection signals and/or P2P signals (block 214). The P2P devices may report the pathloss measurements and network addresses of the P2P group owners to a WAN (e.g., serving base stations) (block 216).

The WAN (e.g., the base stations or some other network entity) may determine which WAN devices, if any, cause strong interference to specific P2P groups (block 218). The WAN may schedule the WAN devices such that jamming of the P2P groups can be avoided (block 220).

The WAN may perform resource partitioning and/or association based on the measurements from the P2P devices (block 222). Allocation of resources to P2P groups may be performed in a network-controlled fashion and may be orchestrated by a base station, possibly involving some coordination among neighboring base stations. Resource partitioning and association decisions may be communicated to the P2P devices (block 224). The P2P devices may report their residual interference levels after dominant interference from the WAN devices has been mitigated.

The network-controlled architecture may provide better overall performance for WAN communication and P2P communication. The network-controlled architecture may have access to loading and scheduling information for WAN devices and may be able to estimate the performance achievable by WAN communication and also the performance achievable by P2P communication. Hence, the network-controlled architecture may be able to more accurately access the impact of association decisions and may also be able to jointly make resource partitioning and association decisions that can yield better performance.

Figure 3:
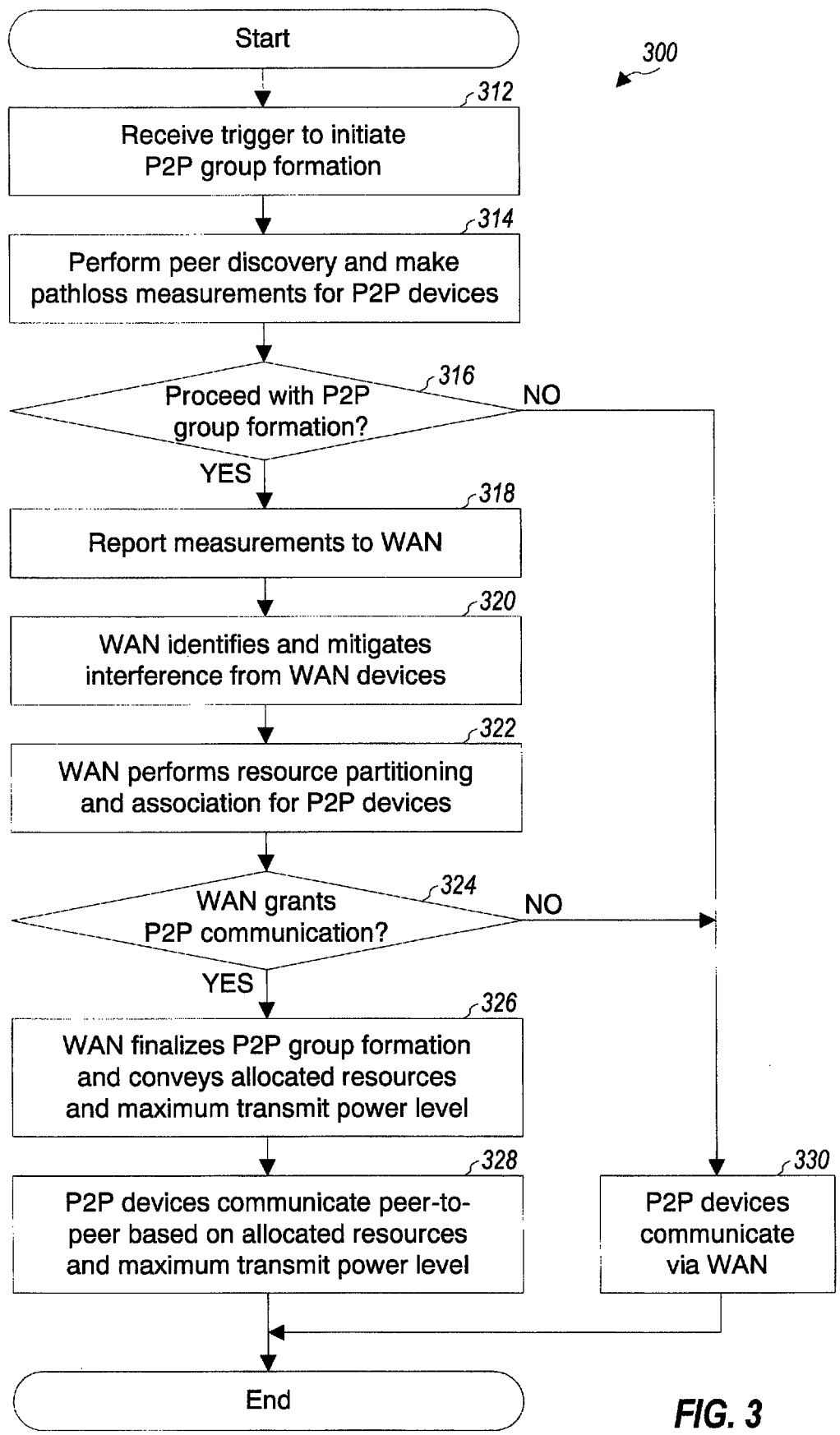
FIG. 3 shows a process for performing resource partitioning and association based on the network-controlled architecture.

FIG. 3 shows a design of a process 300 for performing resource partitioning and association to support P2P communication based on the network-controlled architecture. For clarity, much of the description below assumes a case in which two P2P devices A and B desire to communicate peer-to-peer. The case involving more than two P2P devices can follow straightforwardly. P2P devices A and B may be within the coverage of base station A, which may be a serving base station of P2P devices A and B. P2P devices A and B may correspond to devices 120a and 120b in FIG. 1, and base station A may correspond to base station 110a in FIG. 1.

A trigger to initiate formation of a P2P group for P2P devices A and B may be received (block 312). The trigger may be provided by a discovery mechanism, which may be part of a P2P application. The trigger may initiate an access procedure used by P2P devices A and B to form a new P2P group. P2P device A and/or P2P device B may then perform peer discovery to detect the presence of one another. P2P device A may be designated as a P2P group owner, and P2P device B may be designated as a P2P client.

In one design, P2P device B may detect a proximity detection signal from P2P device A (block 314). P2P device B may estimate the pathloss for P2P device A and obtain a network address of P2P device A based on the proximity detection signal (block 314). P2P device B may also detect proximity detection signals from neighboring P2P group owners and may estimate pathloss for these P2P group owners and obtain their network addresses based on the proximity detection signals of these P2P group owners (also block 314). P2P clients in the neighboring P2P groups may also detect the proximity detection signal from P2P device A and may estimate the pathloss for P2P device A and obtain the network address of P2P device A based on the proximity detection signal from P2P device A (also block 314). Alternatively or additionally, P2P device A may detect a proximity detection signal from P2P device B and may make pathloss measurement for P2P device B and/or obtain a network address of P2P device B (also block 314). In general, P2P clients may detect proximity detection signals from P2P servers and/or other P2P clients. Alternatively or additionally, P2P servers may detect proximity detection signals from P2P clients and/or other P2P servers.

A determination may be made whether to proceed with P2P group formation (step 316). P2P group formation may be aborted for various reasons such as high pathloss between P2P devices A and B, etc. If a determination is made to abort P2P group formation, then P2P devices A and B may communicate via a WAN (block 330). Otherwise, P2P device A and/or B may report pathloss measurements and network addresses to the WAN (e.g., to serving base station A) (block 318). The P2P group owner and P2P clients may report separately.

The WAN (e.g., base station A) may configure WAN devices for transmission of sounding reference signals (SRS). A sounding reference signal is a reference signal that is transmitted by a transmitter to enable a receiver to estimate the quality of a wireless channel between the transmitter and the receiver. A sounding reference signal may include known modulation symbols transmitted on a set of subcarriers, which may or may not vary over time. The P2P devices may estimate interference on different time-frequency resources and may detect strong interference on certain time-frequency resources from WAN devices based on the sounding reference signals transmitted by the WAN devices. Strong interference may be quantified by interference exceeding a particular threshold. The P2P devices may report strong interference conditions and the time-frequency resources on which strong interference is detected to the WAN (also block 318). The WAN may know the SRS configurations of the WAN devices and may be able to identify one or more nearby WAN devices for each P2P device reporting strong interference (block 320). The WAN may mitigate the strong interference from the WAN devices via scheduling, or resource partitioning, or some other mechanism, as described below (also block 320).

Network-controlled resource partitioning and association may be performed either jointly or separately for the P2P devices (block 322). For association, the WAN may determine whether P2P communication or WAN communication will provide better performance for P2P devices A and B based on the pathloss measurements from the P2P devices. For resource partitioning, the WAN may assign resources to P2P devices A and B for P2P communication and may also determine a maximum transmit power level for the P2P devices. Base station A may (i) autonomously perform resource partitioning and association for the P2P devices or (ii) coordinate with one or more neighboring base stations for resource partitioning and association, depending on the location of the P2P devices.

A determination may be made whether P2P communication is selected for P2P devices A and B (block 324). If P2P communication is not selected, then P2P devices A and B may communicate via the WAN (block 330). Otherwise, the WAN may inform P2P devices A and B of the assigned resources and the maximum transmit power level (block 326). P2P devices A and B may then communicate peer-to-peer on the assigned resources (block 328). P2P device B may perform a random access channel (RACH) procedure on the assigned resources to establish a communication link with P2P device A (also block 328). The various steps in FIG. 3 are described in further detail below.

A new P2P client may desire to join an existing P2P group. The new P2P client may perform an access procedure, which may be similar to the procedure shown in FIG. 3 for P2P group formation. The new P2P client may perform discovery for P2P devices, make pathloss measurements for detected P2P devices, and report the measurements to the WAN, e.g., in similar manner as for P2P group formation described above. Furthermore, interfering WAN devices in the vicinity of the new P2P client may be identified as described above. The WAN may perform resource partitioning and association for the new P2P client based on the reported measurements and the identified interfering WAN devices. The WAN may determine changes to the resource partitioning and association as a result of the new P2P client joining the P2P group and may communicate the changes to the group P2P owner, as described above.

In one design, P2P devices may perform peer discovery and make pathloss measurements based on proximity detection signals. A proximity detection signal may comprise a reference signal and/or other signals and transmissions. A reference signal is a signal that is known a priori by a transmitter and a receiver and may also be referred to as pilot. A P2P device may occasionally (e.g., periodically) transmit a proximity detection signal to allow other devices to detect the presence of the P2P device. Alternatively or additionally, the P2P device may occasionally detect proximity detection signals from other devices within its proximity. A proximity detection signal may be transmitted on resources reserved for transmitting proximity detection signals, which may have less interference than other resources and may enable detection of the proximity detection signal by devices farther away. A proximity detection signal may also be transmitted on resources used for WAN communication and/or P2P communication.

A proximity detection signal may be generated in various manners and may include various types of information such as a discovery identity (ID) of a transmitting P2P device, a network address of the transmitting P2P device, a service being offered or requested by the transmitting P2P device, and/or other information. A discovery ID may be unique for a P2P device within a small area (e.g., the coverage area of a base station) whereas a network address may be unique for the P2P device over a larger area. Different P2P devices may also transmit different information in the proximity detection signal. In one design, a P2P group owner may transmit its discovery ID or network address in a proximity detection signal to enable P2P clients to obtain the network address of the P2P group owner. In one design, the network address may be obtained by receiving a discovery ID from the proximity detection signal and translating the discovery ID to a network address through a registration/discovery server. In another design, the network address may be obtained directly from the proximity detection signal.

In one design, P2P group owners may occasionally (e.g., periodically) transmit proximity detection signals to allow other devices to detect the presence of the P2P group owners. In this design, P2P device A in FIG. 3 may transmit a proximity detection signal, and P2P device B may detect the proximity detection signal. P2P device B may estimate the pathloss between P2P devices A and B and may also determine the network address of P2P device A based on the proximity detection signal transmitted by P2P device A.

In another design, P2P clients may occasionally transmit proximity detection signals to allow other devices to detect the presence of the P2P clients. In this design, P2P device B in FIG. 3 may transmit a proximity detection signal, and P2P device A may detect the proximity detection signal. P2P device A may estimate the pathloss and determine the network address of P2P device B based on the proximity detection signal transmitted by device B.

In yet another design, each P2P device may transmit a proximity detection signal and may also detect proximity detection signals from other P2P devices. In this design, P2P device A may detect P2P device B and may estimate the pathloss and determine the network address of P2P device B based on the proximity detection signal transmitted by device B. Similarly, P2P device B may detect P2P device A and may estimate the pathloss and may determine the network address of P2P device A based on the proximity detection signal transmitted by device A.

P2P devices (e.g., P2P clients) in neighboring P2P groups that might be interfered by transmissions from P2P device A may detect the proximity detection signal from P2P device A and determine the pathloss to P2P device A and the network address of P2P device A. The P2P devices in the neighboring P2P groups may report their pathloss measurements and/or the network address of P2P device A to their P2P group owners or to their base stations, which may collect the feedback from existing P2P groups.

P2P devices A and/or B may also proceed in a similar manner. In particular, P2P device A and/or B may detect proximity detection signals from P2P devices in neighboring P2P groups, determine the pathloss and network addresses of the neighboring P2P devices, and report these pathloss measurements and network addresses to serving base station A.

P2P devices A and/or B may also measure the received signal strength and/or received signal quality of their serving base station A and may report the measurements to base station A. These measurements may be used to estimate the performance of P2P devices A and B for WAN communication. This performance information may be used, together with the other reported measurements, for association to determine whether to select P2P communication or WAN communication for P2P devices A and B.

Resources may be statically or semi-statically allocated for WAN communication and P2P communication. In this case, WAN devices may cause strong interference to P2P devices, and vice versa. To avoid strong interference conditions that may arise if the WAN devices and P2P devices are in close proximity, the WAN devices that are dominant interferers to the P2P devices may be identified.

WAN devices that cause strong interference to P2P devices may be identified in various manners. In one design, interfering WAN devices may be identified based on measurements by P2P devices, as described below. In another design, interfering WAN devices may be identified based on their locations relative to the locations of the P2P devices. The locations of the devices may be estimated based on received signal strength measurements, positioning, and/or other means. In yet another design, interfering WAN devices may be identified based on radio frequency (RF) fingerprinting. Different devices may be assumed to be located near each other if they have similar received signal strength measurements for a set of cells. Interfering WAN devices may also be identified in other manners.

In one design, to facilitate detection of interfering WAN devices to P2P devices, the WAN devices may be configured by the wireless network to transmit sounding reference signals. In one design, different WAN devices may be configured to transmit their sounding reference signals on different sets of subcarriers and/or with other distinguishing characteristics to enable these WAN devices to be identified based on their sounding reference signals.

In one design, P2P devices may measure interference on different time-frequency resources and may detect strong interference due to the sounding reference signals from WAN devices. The P2P devices may report strong interference conditions, along with information on the specific resources on which the strong interference was detected, to their serving base stations. The base stations may be aware of which WAN devices were scheduled to transmit on what specific resources. The base stations may then be able to determine which WAN devices were likely to have caused the strong interference based on the interference conditions reported by the P2P devices.

The base stations may be able to identify WAN devices causing strong interference to P2P devices based on the reports from the P2P devices. Strong interference from the identified WAN devices may be reduced in various manners. In one design, the base stations may mitigate interference due to the interfering WAN devices through scheduling. The base stations may schedule the interfering WAN devices on resources not used by the P2P devices so that strong interference to the P2P devices can be avoided. Scheduling may be effective in mitigating strong interference. However, some residual interference from the WAN devices may remain. In one design, the residual interference from the WAN devices may be measured by the P2P devices over time and may be reported to the base stations. Information on the residual interference may be considered when performing resource partitioning. In another design, the residual interference may not be reported (e.g., as part of a P2P group formation procedure). In this case, a nominal value for interference-over-thermal (IoT) may be used for initial resource partitioning. After completing P2P group formation, the nominal IoT value may be refined once P2P communication has been established.

In one design, a base station may receive measurements from all P2P groups within its coverage and control and may perform resource partitioning and association in a centralized fashion. The P2P groups under the control of the base station may include "cell-center" P2P groups and "cell-edge" P2P groups. The cell-center P2P groups may be located near the cell center and may observe little interference from neighboring P2P groups, which are not under the control of the base station. The cell-edge P2P groups may be located near the cell edge and may observe strong interference from the neighboring P2P groups.

In one design, a base station may autonomously perform resource partitioning and association for the cell-center P2P groups, without having to interact with neighboring base stations. The base station may coordinate with one or more neighboring base stations to mitigate interference between the cell-edge P2P groups and the neighboring P2P groups. However, the coordination between base stations may be limited as much as possible in order to reduce complexity.

In one design, association and resource partitioning may be performed jointly. For example, a determination may be made whether a P2P group would be better served with P2P communication or WAN communication based on initial assignments of resources for P2P communication and also for WAN communication. A communication mode that can provide better performance may be selected. In general, the network-control architecture can support a variety of resource partitioning and association schemes that may have different complexity and performance tradeoffs.

A base station may make resource partitioning and association decisions for P2P devices, as described above. In one design, the base station may communicate the decisions to the P2P group owners. These decisions may include assignment of resources to the P2P groups as well as start time at which the resource assignments will become effective. For P2P group formation, the base station may also inform P2P clients of resources for a random access channel (RACH) to use to establish a connection with their P2P group owners.

In one design, different hypotheses for appointment of P2P group owners may be tested in order to determine which appointment will provide better performance. In the network-controlled architecture, testing such hypotheses may be relatively easy to implement since most of the computations may be internal to the base station (apart from some coordination that may be performed for a P2P group at cell-edge).

In the network-controlled architecture, the WAN may orchestrate resource partitioning and may have a fairly accurate estimate of the throughput/utility that may be achievable by a group of devices. The WAN may thus have knowledge of the performance of P2P devices for both WAN communication and P2P communication. The WAN may use this knowledge to make association decisions more judiciously. As a result, it may be desirable in the network-controlled architecture to jointly perform resource partitioning and association, which may provide better performance over performing resource partitioning and association separately.

A base station may perform resource partitioning and association for P2P groups within its coverage for the network-controlled architecture. However, there may be some P2P groups located at the edge of coverage of multiple base stations.

Figure 4:
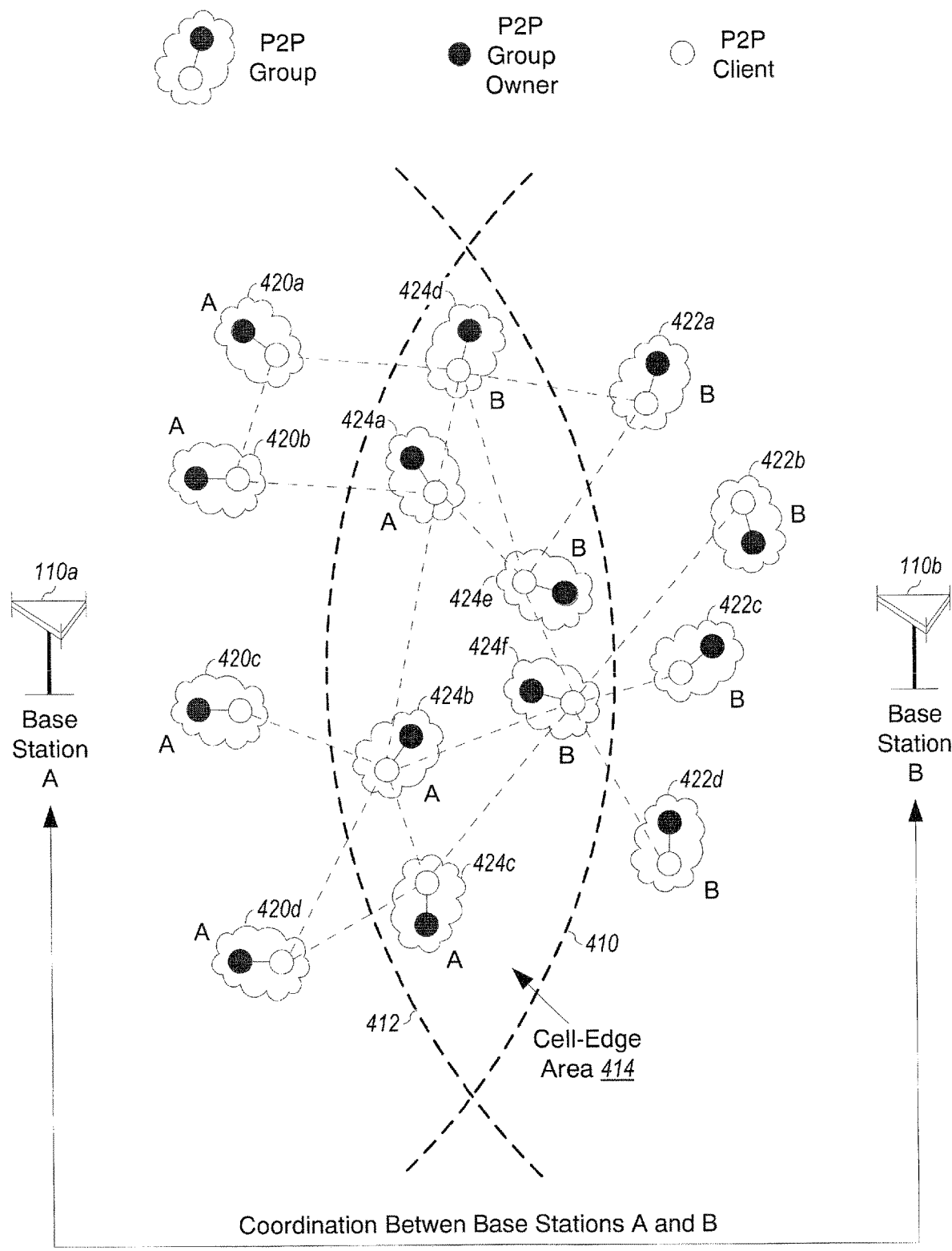
FIG. 4 shows P2P communication in a wireless network.

FIG. 4 shows P2P communication in a wireless network. Two base station 110a and 110b may support communication for WAN devices, which are not shown in FIG. 4. Base station 110a may have a coverage area to the left of a dashed line 410, and base station 110b may have a coverage area to the right of a dashed line 412. A cell-edge area 414 may correspond to the overlapping portion of the coverage area of base station 110a and the coverage area of base station 110b.

In the example shown in FIG. 4, four P2P groups 420a through 420d may be located within the coverage of base station 110a, and four P2P groups 422a through 422d may be located within the coverage of base station 110b. Six cell-edge P2P groups 424a through 424f may be located within cell-edge area 414. P2P groups 424a through 424c may be under the control of base station 110a, and P2P groups 424d through 424f may be under the control of base station 110b. For simplicity, FIG. 4 shows each P2P group including two P2P devices. For each P2P group, a P2P group owner is shown by a dark filled circle, and a P2P client is shown by an unfilled circle. A P2P device in a given P2P group may receive interference from P2P devices in other P2P groups. The interference between P2P devices is represented by dashed lines between P2P clients in FIG. 4.

Each base station may autonomously perform resource partitioning and association for cell-center P2P groups under the control of that base station and not observing strong interference from WAN devices communicating with neighbor base stations. In the example shown in FIG. 4, base station 110a may perform resource partitioning and association for P2P groups 420a through 420d, and base station 110b may perform resource partitioning and association for P2P groups 422a through 422d. Neighboring base stations may coordinate to perform resource partitioning and association for cell-edge P2P groups located at the coverage edge of these base stations. These cell-edge P2P groups may be within close proximity of one another and may cause strong interference. For example, base stations 110a and 110b may coordinate to perform resource partitioning and association for P2P groups 424a through 424f in FIG. 4 so that good performance can be achieved for all P2P groups 422. The amount of coordination between base stations to address cell-edge P2P groups may be limited as much as possible in order to reduce loading on the backhaul and to leverage the fact that cell-center P2P groups that are located closer to the cell-center do not require such coordination.

In one design, resource partitioning for cell-edge P2P groups and cell-center P2P groups may be performed as follows. Initially, cell-edge P2P groups that may require coordination between base stations may be identified. These P2P groups may be associated with different base stations but may require coordination by their base stations for resource partitioning. Once the cell-edge P2P groups have been identified, one of the base stations may be selected to determine an initial resource partitioning for these P2P groups. The initial resource partitioning may be fixed. Each base station may then perform resource partitioning for the remaining cell-center P2P groups within its coverage, with the constraint of the initial resource partitioning for the cell-edge P2P groups. This design may limit coordination between base stations to the initial stage of resource partitioning.

In another design, resource partitioning for cell-edge P2P groups and cell-center P2P groups may be performed in an iterative manner. In this design, neighboring base stations may take turn in evaluating resource partitioning for the cell-edge P2P groups. The base stations may then negotiate on a particular resource partitioning for the cell-edge P2P groups. Each base station may then perform resource partitioning for its cell-center P2P groups, with the constraint of the initial resource partitioning for the cell-edge P2P groups.

In yet another design, neighboring base stations may statically or semi-statically reserve some resources for cell-edge P2P groups associated with each base station. Each base station may then assign its cell-edge P2P groups with resources that have been reserved for the cell-edge P2P groups associated with that base station. This design may reduce coordination between base stations, which may be limited to the static/semi-static reservation of resources for cell-edge P2P groups.

Coordination between base stations for resource partitioning for cell-edge P2P groups may also be performed in other manners. In general, a specific coordination mechanism may be selected for cell-edge P2P groups based on a tradeoff between performance and overhead as well as the number of available resources. A small number of available resources may necessitate more careful planning in order to achieve good performance. A large number of available resources may allow for more flexibility in resource partitioning and hence may require less coordination between base stations to achieve good performance.

Figure 5:
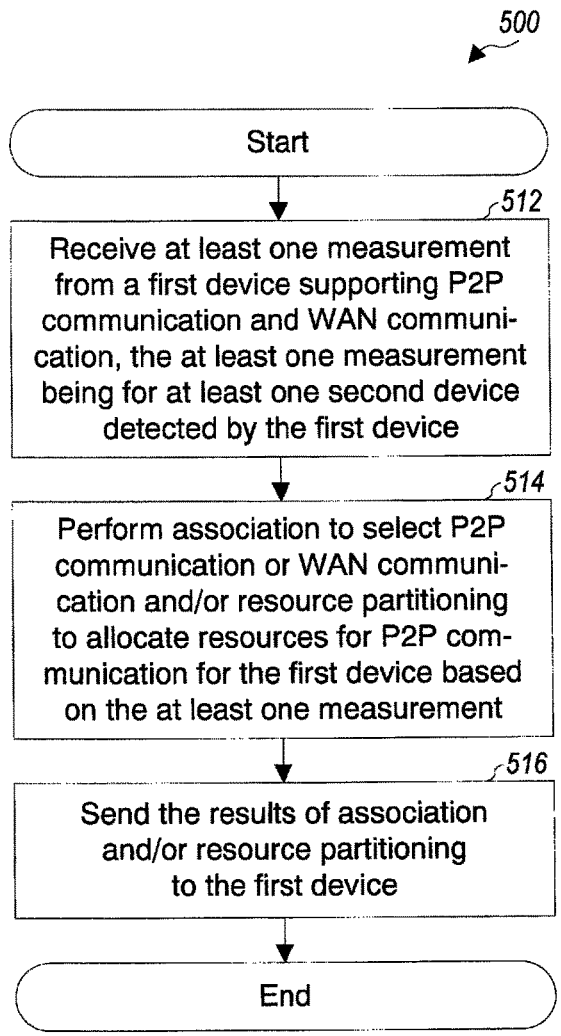
FIG. 5 shows a process for supporting P2P communication.

FIG. 5 shows a design of a process 500 for supporting wireless communication. Process 500 may be performed by a network entity, which may be a base station, a network controller, or some other entity. The network entity may receive at least one measurement from a first device, which may support P2P communication and WAN communication (block 512). The at least one measurement may be for at least one second device detected by the first device. The reporting of the at least one measurement may be initiated by the first device, which may not be engaged in WAN communication prior to sending the at least one measurement. The network entity may perform association to select P2P communication or WAN communication and/or resource partitioning to allocate resources for P2P communication for the first device based on the at least one measurement (block 514). The network entity may send results of the association and/or the resource partitioning to the first device (block 516).

In one design of block 512, at least one pathloss measurement may be received from the first device. Each pathloss measurement may indicate the pathloss between the first device and one of the at least one second device. At least one network address of the at least one second device may also be received from the first device. A P2P group including the first device and the at least one second device may be identified based on the at least one network address of the at least one second device.

In one design of block 514, association may be performed, and P2P communication or WAN communication may be selected for the first device based on the at least one measurement. In one design, the performance of the first device for P2P communication may be estimated, and the performance of the first device for WAN communication may also be estimated. P2P communication or WAN communication may be selected for the first device based on the estimated performance for P2P communication and the estimated performance for WAN communication. A decision of P2P communication or WAN communication being selected for the first device may be sent to the first device (as shown in block 516).

In another design of block 514, resource partitioning may be performed, and resources may be allocated to the first device for P2P communication. Information indicative of the allocated resources may be sent to the first device in block 516. In one design, a maximum transmit power level for the first device for P2P communication may be determined. Information indicative of the maximum transmit power level may be sent to the first device. In one design, one or more measurements may be received from a third device desiring to join a P2P group including the first device. Allocation of resources for the P2P group may be updated to account for the third device joining the P2P group.

In one design, information indicative of (e.g., at least one network address of) at least one P2P device potentially causing strong interference to the first device may be received. Resources may be allocated to the first device and/or the at least one P2P device such that interference from the at least one P2P device to the first device may be reduced.

In one design, to support inter-cell interference coordination, measurements for one or more P2P devices may be received from the first device, which may be located within the coverage of a first base station. The one or more P2P devices may be located within the coverage of a second base station. The measurements for the one or more P2P devices may be forwarded from the first base station to the second base station.

In one design, resource partitioning may be performed for a first P2P group by the first base station with coordination with at least one neighboring base station. Resource partitioning for a second P2P group may be performed by the first base station without coordination with the at least one neighboring base station. The first base station and the at least one neighboring base station may negotiate to assign resources to the first P2P group. In one design, first resources may be assigned to the first P2P group by a designated base station, which may be a base station designated to support the first P2P group in a group of base stations including the first base station and the at least one neighboring base station. Second resources may be selected by the first base station from among available resources that exclude the first resources and may be assigned to the second P2P group. In another design, first resources may be selected by the first base station from reserved resources for cell-edge P2P groups and may be assigned to the first P2P group. Second resources may be selected by the first base station from available resources that exclude the reserved resources and may be assigned to the second P2P group.

In one design, at least one interference measurement for at least one WAN device may be received from the first device. Each WAN device may communicate with the WAN. Each interference measurement may indicate strong interference detected by the first device from one WAN device. The at least one WAN device may be scheduled on different resources to reduce interference to the first device. Alternatively or additionally, the transmit power level of the at least one WAN device may be reduced to mitigate interference to the first device.

In one design, the at least one WAN device may be configured to transmit a sounding reference signal on different resources. Each interference measurement may indicate the particular resources on which strong interference is detected by the first device. The at least one WAN device causing strong interference to the first device may be identified based on the resources on which strong interference is detected by the first device and the resources on which each WAN device is configured to transmit the sounding reference signal.

Figure 6:
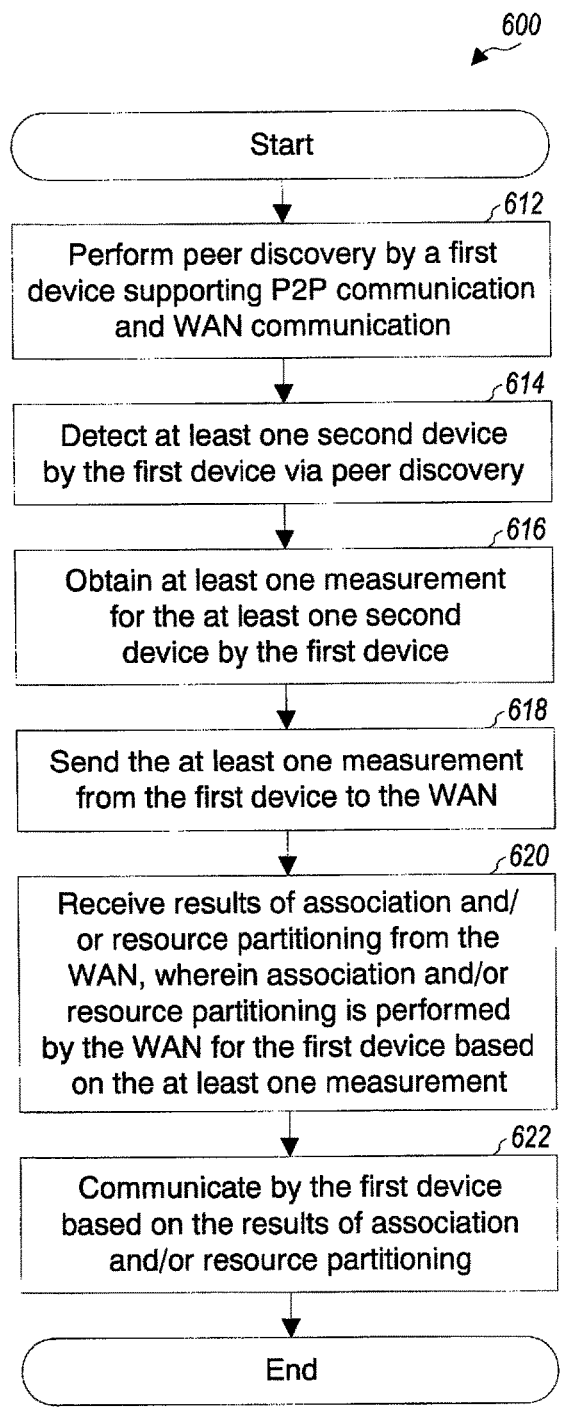
FIG. 6 shows a process for engaging in P2P communication.

FIG. 6 shows a design of a process 600 for wireless communication in a WAN. Process 600 may be performed by a first device (as described below) or by some other entity. The first device may support P2P communication and WAN communication, may perform peer discovery (block 612), and may detect at least one second device via peer discovery (block 614). The first device may obtain at least one measurement for the at least one second device (block 616) and may send the at least one measurement to the WAN (block 618). In one design, the first device may determine at least one network address of the at least one second device and may send the at least one network address of the at least one second device to the WAN. The first device may receive the results of association to select P2P communication or WAN communication and/or resource partitioning to allocate resources for P2P communication from the WAN (block 620). The WAN may perform association and/or resource partitioning for the first device based on the at least one measurement. The first device may communicate based on the results of association and/or resource partitioning (block 622).

In one design of block 612, the first device may transmit a proximity detection signal to enable at least one other device to detect the first device. In another design, the first device may detect at least one proximity detection signal from the at least one second device. The first device may then make at least one measurement for the at least one second device based on the at least one proximity detection signal. In one design, the first device may make at least one pathloss measurement for the at least one second device, with each pathloss measurement indicating the pathloss between the first device and one second device.

In one design of block 620, the first device may receive a decision of P2P communication or WAN communication selected by the WAN for the first device. The first device may communicate directly with the at least one second device if P2P communication is selected. In another design of block 622, the first device may receive information indicative of resources allocated to the first device for P2P communication. The first device may communicate directly with the at least one second device on the allocated resources.

In one design, the first device may receive a maximum transmit power level to use for P2P communication. The first device may then transmit at the maximum transmit power level or lower for P2P communication.

In one design, the first device may detect at least one P2P device potentially causing strong interference to the first device. The first device may send information indicative of the at least one P2P device to the WAN. The at least one P2P device may be scheduled (e.g., on different resources) to mitigate interference to the first device.

In one design, the first device may make at least one interference measurement for at least one WAN device. Each interference measurement may be made on different resources and may indicate interference detected by the first device from one WAN device. Each interference measurement may be associated with particular resources on which the strong interference is detected by the first device. The first device may send the at least one interference measurement for the at least one WAN device to the WAN. The at least one WAN device may be scheduled and/or may have their transmit power reduced to mitigate interference to the first device.

In one design, the first device may be a P2P client in a P2P group including the first device and the at least one second device. The first device may perform a random access procedure to establish a P2P communication link with the at least one second device. In another design, the first device may be a P2P server in the P2P group. The first device may schedule the at least one second device (e.g., based on resources allocated to the P2P group) for data transmission for P2P communication.

Figure 7B:
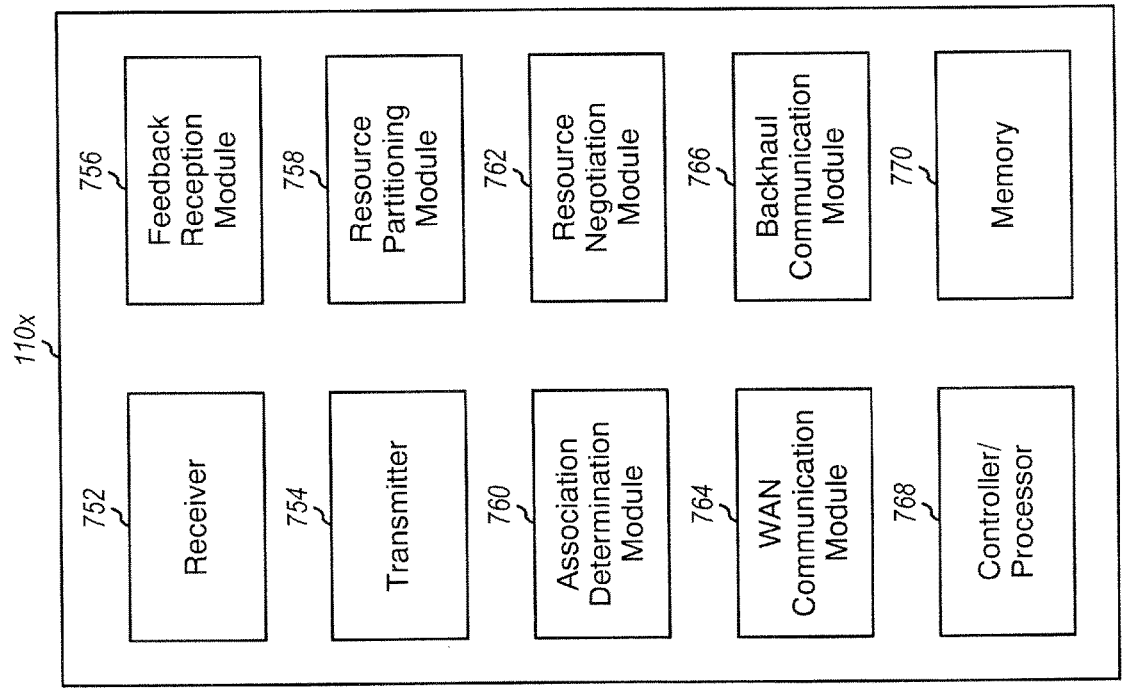
FIG. 7B shows a block diagram of a base station.
Figure 7A:
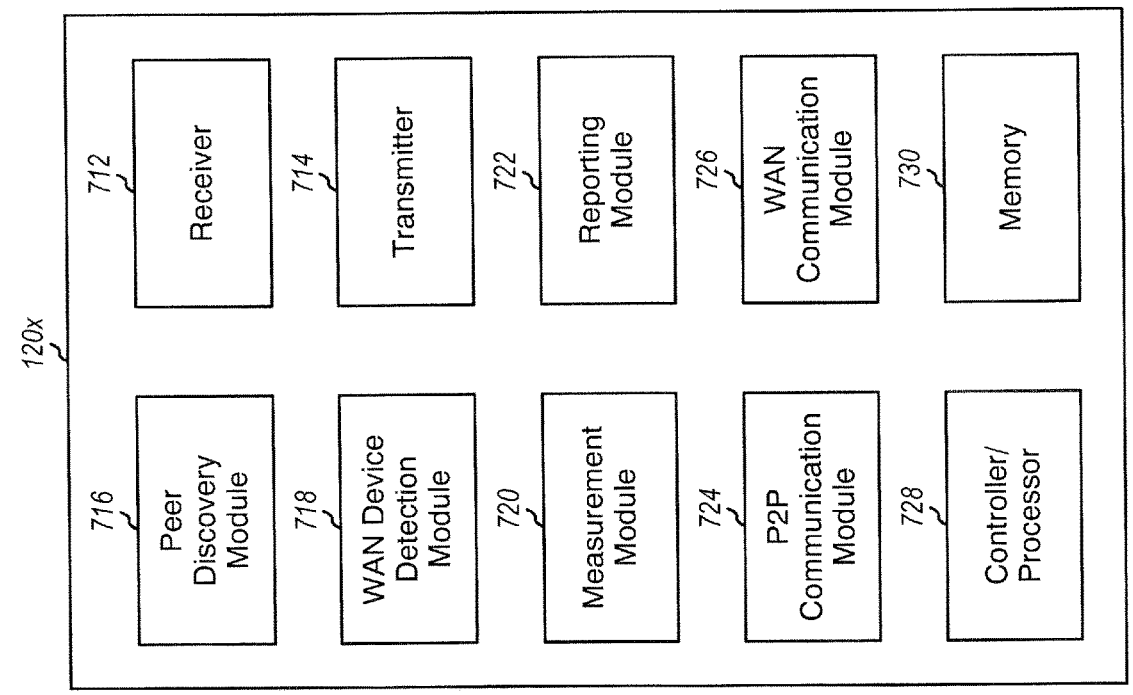
FIG. 7A shows a block diagram of a device.

FIG. 7A shows a block diagram of a design of a device 120x capable of P2P communication and WAN communication. Within device 120x, a receiver 712 may receive proximity detection signals and P2P signals transmitted by P2P devices for P2P communication and downlink signals transmitted by base stations for WAN communication. A transmitter 714 may transmit a proximity detection signal and P2P signals to P2P devices for P2P communication and uplink signals to base stations for WAN communication. A module 716 may perform peer discovery and detect P2P devices. A module 718 may detect interfering WAN devices. A module 720 may make measurements for received power of detected devices and base stations and may determine pathloss based on the received power measurements. Module 720 may also measure interference on different resources that may be used for P2P communication.

A module 722 may report the measurements, network addresses, and/or other information to a serving base station. A module 724 may support P2P communication, e.g., generate and process signals used for P2P communication. A module 726 may support WAN communication, e.g., generate and process signals used for WAN communication. The various modules within device 120x may operate as described above. A controller/processor 728 may direct the operation of various modules within device 120x. A memory 730 may store data and program codes for device 120x.

FIG. 7B shows a block diagram of a design of a base station 110x supporting P2P communication and WAN communication. Within base station 110x, a receiver 752 may receive uplink signals transmitted by devices for WAN communication. A transmitter 754 may transmit downlink signals to devices for WAN communication. A module 756 may receive reports comprising measurements, network addresses, etc., from devices. A module 758 may perform resource partitioning to allocate some of the available resources for P2P communication.

A module 760 may perform association and select WAN communication or P2P communication for devices. A module 762 may perform resource negotiation with other base stations to determine resources to allocate for P2P communication, e.g., as described above. A module 764 may support WAN communication for devices, e.g., generate and process signals used for WAN communication. A module 766 may support communication with other network entities (e.g., other base stations) via the backhaul (e.g., for resource partitioning). The various modules within base station 110x may operate as described above. A controller/processor 768 may direct the operation of various modules within base station 110x. A memory 730 may store data and program codes for base station 110x.

The modules within device 120x in FIG. 7A and the modules within base station 110x in FIG. 7B may comprise processors, electronic devices, hardware devices, electronic components, logical circuits, memories, software codes, firmware codes, etc., or any combination thereof.

Figure 8:
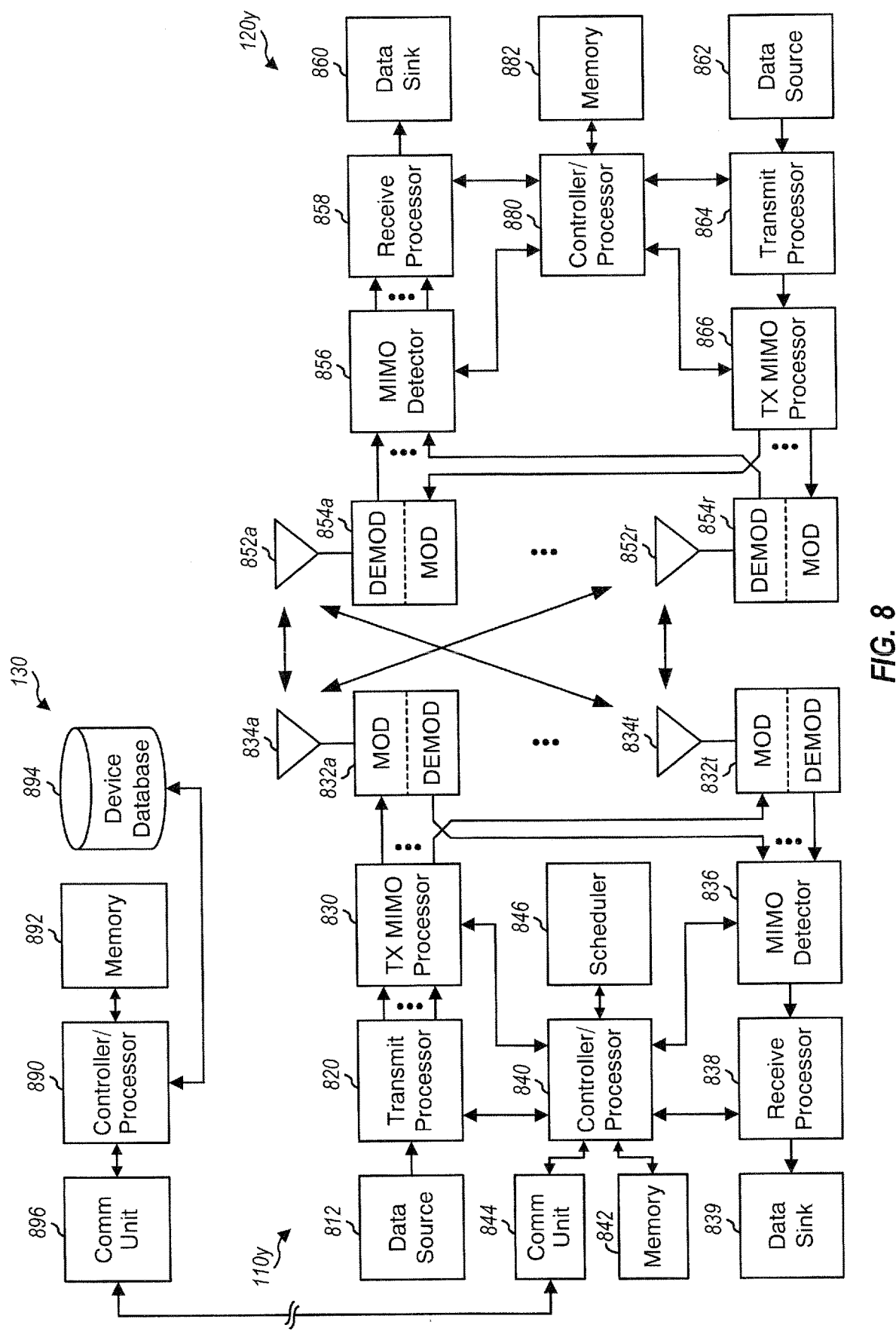
FIG. 8 shows a block diagram of a base station and a device.

FIG. 8 shows a block diagram of a design of a base station 110y and a device 120y, which may be one of the base stations and one of the devices in FIG. 1. Base station 110y may be equipped with T antennas 834a through 834t, and device 120y may be equipped with R antennas 852a through 852r, where in general T≥1 and R≥1.

At base station 110y, a transmit processor 820 may receive data from a data source 812 and control information (e.g., messages for resource partitioning and association) from a controller/processor 840. Processor 820 may process (e.g., encode and modulate) the data and control information to obtain data symbols and control symbols, respectively. Processor 820 may also generate reference symbols for synchronization signals, reference signals, etc. A transmit (TX) multiple-input multiple-output (MIMO) processor 830 may perform spatial processing (e.g., precoding) on the data symbols, the control symbols, and/or the reference symbols, if applicable, and may provide T output symbol streams to T modulators (MODs) 832a through 832t. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. T downlink signals from modulators 832a through 832t may be transmitted via T antennas 834a through 834t, respectively.

At device 120y, antennas 852a through 852r may receive the downlink signals from base station 110y, downlink signals from other base stations, uplink signals from WAN devices, and/or P2P signals and proximity detection signals from other P2P devices. Antennas 852a through 852r may provide received signals to demodulators (DEMODs) 854a through 854r, respectively. Each demodulator 854 may condition (e.g., filter, amplify, downconvert, and digitize) a respective received signal to obtain input samples. Each demodulator 854 may further process the input samples (e.g., for OFDM, SC-FDMA, etc.) to obtain received symbols. A MIMO detector 856 may obtain received symbols from all R demodulators 854a through 854r, perform MIMO detection on the received symbols if applicable, and provide detected symbols. A receive processor 858 may process (e.g., demodulate and decode) the detected symbols, provide decoded data for device 120y to a data sink 860, and provide decoded control information to a controller/processor 880.

On the uplink, at device 120y, a transmit processor 864 may receive data from a data source 862 and control information (e.g., reports for detected P2P devices and/or WAN devices) from controller/processor 880. Processor 864 may process (e.g., encode and modulate) the data and control information to obtain data symbols and control symbols, respectively. Processor 864 may also generate reference symbols for a reference signal, a proximity detection signal, etc. The symbols from transmit processor 864 may be precoded by a TX MIMO processor 866 if applicable, further processed by modulators 854a through 854r (e.g., for SC-FDMA, OFDM, etc.), and transmitted to base station 110y, other base stations, and/or other P2P devices. At base station 110y, the uplink signals from device 120y and other devices may be received by antennas 834, processed by demodulators 832, detected by a MIMO detector 836 if applicable, and further processed by a receive processor 838 to obtain decoded data and control information sent by device 120y and other devices. Processor 838 may provide the decoded data to a data sink 839 and the decoded control information to controller/processor 840.

Controllers/processors 840 and 880 may direct the operation at base station 110y and device 120y, respectively. Processor 840 and/or other processors and modules at base station 110y may perform or direct all or part of process 200 in FIG. 2, process 300 in FIG. 3, process 500 in FIG. 5, and/or other processes for the techniques described herein. Processor 880 and/or other processors and modules at device 120y may perform or direct all or part of process 200 in FIG. 2, process 300 in FIG. 3, process 600 in FIG. 6, and/or other processes for the techniques described herein. Memories 842 and 882 may store data and program codes for base station 110y and device 120y, respectively. A communication (Comm) unit 844 may enable base station 110y to communicate with other network entities. A scheduler 846 may schedule devices for data transmission on the downlink and/or uplink.

FIG. 8 also shows a design of network controller 130 in FIG. 1. Within network controller 130, a controller/processor 890 may perform various functions to support peer discovery, P2P communication, and WAN communication. Controller/processor 890 may also perform part of process 200 in FIG. 2, process 300 in FIG. 3, process 500 in FIG. 5, and/or other processes for the techniques described herein. A memory 892 may store program codes and data for network controller 130. A storage unit 894 may store information (e.g., network addresses) for P2P devices. A communication unit 896 may enable network controller 130 to communicate with other network entities.

In one configuration, apparatus 110*x*, 110*y*, or 130 for wireless communication may include means for receiving at least one measurement from a first device supporting P2P communication and WAN communication, the at least one measurement being for at least one second device detected by the first device, means for performing association and/or resource partitioning for the first device based on the at least one measurement, and means for sending the results of association and/or resource partitioning to the first device.

In another configuration, apparatus 120*x* or 120*y* for wireless communication may include means for performing peer discovery by a first device supporting P2P communication and WAN communication, means for detecting at least one second device by the first device via peer discovery, means for obtaining at least one measurement for the at least one second device by the first device, means for sending the at least one measurement from the first device to the WAN, means for receiving the results of association and/or resource partitioning from the WAN, wherein association and/or resource partitioning are performed by the WAN for the first device based on the at least one measurement, and means for communicating by the first device based on the results of association and/or resource partitioning.

In an aspect, the aforementioned means for apparatus 120*x* or 120*y* may be module 716, 718, 720, 722 and/or 728 at device 120*x* or processors 858, 864 and/or 880 at device 120*y*, which may be configured to perform the functions recited by the aforementioned means. The aforementioned means for apparatus 110*x* or 110*y* may be module 756, 758, 760, 762 and/or 768 at apparatus 110*x* or processors 820, 838, 840 and/or 844 at apparatus 110*y*, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication of a base station in a wide area network (WAN), comprising:
receiving at least one measurement from a first peer-to-peer (P2P) device supporting P2P communication and WAN communication, the at least one measurement being a pathloss from at least one second P2P device to the first P2P device;
selecting between P2P communication and WAN communication for communication between the first P2P device and the at least one second P2P device based on the at least one measurement, wherein the WAN communication includes communication between at least one base station and the first P2P device, and wherein the P2P communication includes direct communication between the first P2P device and the at least one second P2P device;
sending results of the selection to the first P2P device, the results indicating the selected one of P2P communication or WAN communication;
receiving, at the base station, at least one interference measurement for at least one WAN device from the first P2P device, the at least one WAN device communicating with the WAN via the base station, the at least one interference measurement indicating interference greater than a threshold detected by the first P2P device from the at least one WAN device, wherein the at least one interference measurement is further indicative of particular resources on which the interference is detected by the first P2P device, wherein the at least one WAN device is different from the first P2P device and the second P2P device;
configuring the at least one WAN device to transmit a sounding reference signal on different resources;
identifying the at least one WAN device causing interference greater than the threshold to the first P2P device based on resources on which the interference is detected by the first P2P device and resources on which each of the at least one WAN device is configured to transmit the sounding reference signal; and
reducing a transmit power level of the identified at least one WAN device to reduce interference to the first P2P device.

2. The method of claim 1, further comprising:
receiving at least one network address of the at least one second P2P device from the first P2P device; and
identifying a P2P group including the first P2P device and the at least one second P2P device based on the at least one network address of the at least one second P2P device.

3. The method of claim 1, wherein the selecting between P2P and WAN communication comprises:
estimating performance of the first P2P device for P2P communication based on the at least one measurement, estimating performance of the first P2P device for WAN communication, and
selecting between P2P communication and WAN communication for communication between the first P2P device and the at least one second P2P device further based on the estimated performance for P2P communication and the estimated performance for WAN communication.

4. The method of claim 1, further comprising: performing resource partitioning and allocating resources to the first P2P device for P2P communication, and wherein the sending the results of the selection comprises sending information indicative of the allocated resources to the first P2P device.

5. The method of claim 1, further comprising:
receiving one or more measurements from a third device desiring to join a P2P group including the first P2P device; and
updating an allocation of resources for the P2P group to account for the third device joining the P2P group.

6. The method of claim 1, further comprising:
determining a maximum transmit power level for the first P2P device for P2P communication; and
sending information indicative of the maximum transmit power level to the first P2P device.

7. The method of claim 1, further comprising:
receiving information indicative of at least one P2P device potentially causing interference greater than the threshold to the first P2P device; and
allocating resources to the first P2P device, or the at least one P2P device, or both to reduce interference from the at least one P2P device to the first P2P device.

8. The method of claim 1, further comprising:
receiving measurements for one or more P2P devices from the first P2P device located within coverage of a first base station, the one or more P2P devices being located within coverage of a second base station; and
forwarding the measurements for the one or more P2P devices from the first base station to a second base station.

9. The method of claim 1, further comprising:
performing resource partitioning for a first P2P group by a first base station with coordination with at least one neighboring base station in the WAN; and
performing resource partitioning for a second P2P group by the first base station without coordination with the at least one neighboring base station.

10. The method of claim 9, wherein the performing resource partitioning for the first P2P group comprises assigning first resources to the first P2P group by a designated base station in a group of base stations including the first base station and the at least one neighboring base station, and wherein the performing resource partitioning for the second P2P group comprises assigning second resources to the second P2P group by the first base station, the second resources being selected from among available resources that exclude the first resources.

11. The method of claim 9, wherein the performing resource partitioning for the first P2P group comprises assigning first resources to the first P2P group by the first base station, the first resources being selected from reserved resources for cell-edge P2P groups within coverage of multiple base stations, and wherein the performing resource partitioning for the second P2P group comprises assigning second resources to the second P2P group by the first base station, the second resources being selected from available resources that exclude the reserved resources.

12. The method of claim 9, wherein the first base station and the at least one neighboring base station negotiate to assign resources to the first P2P group.

13. The method of claim 1, wherein the first P2P device is not engaged in WAN communication prior to sending the at least one measurement.

14. The method of claim 1, wherein reporting of the at least one measurement is initiated by the first P2P device.

15. The method of claim 1, further comprising:
performing resource partitioning to allocate resources for the P2P communication based on the at least one measurement; and
sending results of the resource partitioning to the first P2P device.

16. The method of claim 1, wherein the pathloss is measured by the first P2P device based on proximity detection signals from the at least one second P2P device.

17. The method of claim 1, wherein the results further indicate assignment of resources for the P2P communication and a start time at which the assignments will become effective when the P2P communication is selected for communication between the first P2P device and the at least one second P2P device.

18. An apparatus for wireless communication, the apparatus being a base station, comprising:
means for receiving at least one measurement from a first peer-to-peer (P2P) device supporting P2P communication and wide area network (WAN) communication, the at least one measurement being a pathloss from at least one second P2P device to the first P2P device;
means for selecting between P2P communication and WAN communication for communication between the first P2P device and the at least one second P2P device based on the at least one measurement, wherein the WAN communication includes communication between at least one base station and the first P2P device, and wherein the P2P communication includes direct communication between the first P2P device and the at least one second P2P device;
means for sending results of the selection to the first P2P device, the results indicating the selected one of P2P communication or WAN communication; and
means for receiving, at the base station, at least one interference measurement for at least one WAN device from the first P2P device, the at least one WAN device communicating with the WAN via the base station, the at least one interference measurement indicating interference greater than a threshold detected by the first P2P device from the at least one WAN device, wherein the at least one interference measurement is further indicative of particular resources on which the interference is detected by the first P2P device, wherein the at least one WAN device is different from the first P2P device and the second P2P device,
means for configuring the at least one WAN device to transmit a sounding reference signal on different resources;
means for identifying the at least one WAN device causing interference greater than the threshold to the first P2P device based on resources on which the interference is detected by the first P2P device and resources on which each of the at least one WAN device is configured to transmit the sounding reference signal; and
means for reducing a transmit power level of the identified at least one WAN device to reduce interference to the first P2P device.

19. The apparatus of claim 18, further comprising:
means for receiving at least one network address of the at least one second P2P device from the first P2P device; and
means for identifying a P2P group including the first P2P device and the at least one second P2P device based on the at least one network address of the at least one second P2P device.

20. The apparatus of claim 18, wherein the means for selecting is further configured for performing resource partitioning and allocating resources to the first P2P device for P2P communication, and wherein the means for sending is further configured for sending information indicative of the allocated resources to the first P2P device.

21. The apparatus of claim 18, further comprising:
means for receiving measurements for one or more P2P devices from the first P2P device located within coverage of a first base station, the one or more P2P devices being located within coverage of a second base station; and
means for forwarding the measurements for the one or more P2P devices from the first base station to a second base station.

22. An apparatus for wireless communication, the apparatus being a base station, comprising:
a memory; and
at least one processor coupled to the memory and configured to:
receive at least one measurement from a first peer-to-peer (P2P) device supporting P2P communication and wide area network (WAN) communication, the at least one measurement being a pathloss from at least one second P2P device to the first P2P device;
select between P2P communication and WAN communication for communication between the first P2P device and the at least one second P2P device based on the at least one measurement, wherein the WAN communication includes communication between at least one base station and the first P2P device, and wherein the P2P communication includes direct communication between the first P2P device and the at least one second P2P device;
send results of the selection to the first P2P device, the results indicating the selected one of P2P communication or WAN communication;
receive, at the base station, at least one interference measurement for at least one WAN device from the first P2P device, the at least one WAN device communicating with the WAN via the base station, the at least one interference measurement indicating interference greater than a threshold detected by the first P2P device from the at least one WAN device, wherein the at least one interference measurement is further indicative of particular resources on which the interference is detected by the first P2P device, wherein the at least one WAN device is different from the first P2P device and the second P2P device;
configure the at least one WAN device to transmit a sounding reference signal on different resources;
identify the at least one WAN device causing interference greater than the threshold to the first P2P device based on resources on which the interference is detected by the first P2P device and resources on which each of the at least one WAN device is configured to transmit the sounding reference signal; and
reduce a transmit power level of the identified at least one WAN device to reduce interference to the first P2P device.

23. The apparatus of claim 22, wherein the at least one processor is configured to receive at least one network address of the at least one second P2P device from the first P2P device, and to identify a P2P group including the first P2P device and the at least one second P2P device based on the at least one network address of the at least one second P2P device.

24. The apparatus of claim 22, wherein the at least one processor is configured to perform resource partitioning and allocate resources to the first P2P device for P2P communication, and to send information indicative of the allocated resources to the first P2P device.

25. The apparatus of claim 22, wherein the at least one processor is configured to receive measurements for one or more P2P devices from the first P2P device located within coverage of a first base station, the one or more P2P devices being located within coverage of a second base station, and to forward the measurements for the one or more P2P devices from the first base station to a second base station.

26. A non-transitory computer-readable medium storing computer executable code which when executed by a processor causes the processor to:
   receive at least one measurement from a first peer-to-peer (P2P) device supporting P2P communication and wide area network (WAN) communication, the at least one measurement being a pathloss from at least one second P2P device to the first P2P device;
   receive, at a base station, at least one interference measurement for at least one WAN device from the first P2P device, the at least one WAN device communicating with the WAN via the base station, the at least one interference measurement indicating interference greater than a threshold detected by the first P2P device from the at least one WAN device, wherein the at least one interference measurement is further indicative of particular resources on which the interference is detected by the first P2P device, wherein the at least one WAN device is different from the first P2P device and the second P2P device;
   select between P2P communication and WAN communication for communication between the first P2P device and the at least one second P2P device based on the at least one measurement, wherein the WAN communication includes communication between at least one base station and the first P2P device, and wherein the P2P communication includes direct communication between the first P2P device and the at least one second P2P device;
   send results of the selection to the first P2P device, the results indicating the selected one of P2P communication or WAN communication;
   configure the at least one WAN device to transmit a sounding reference signal on different resources;
   identify the at least one WAN device causing interference greater than the threshold to the first P2P device based on resources on which the interference is detected by the first P2P device and resources on which each of the at least one WAN device is configured to transmit the sounding reference signal; and
   reduce a transmit power level of the identified at least one WAN device to reduce interference to the first P2P device.

* * * * *